United States Patent [19]

Eisenacher et al.

[11] 3,753,784

[45] Aug. 21, 1973

[54] SEPARATOR FOR MAINTENANCE-FREE CELLS

[75] Inventors: Werner Eisenacher, Hildesheim; Eckart von Roda, Diekholzen, both of Germany

[73] Assignee: Robert Bosch, G.m.b.H., Stuttgart, Germany

[22] Filed: Sept. 28, 1970

[21] Appl. No.: 76,071

[30] Foreign Application Priority Data
Oct. 3, 1969 Germany.................. P 19 49 958.2

[52] U.S. Cl. ................................. 136/145, 136/146
[51] Int. Cl. ...................... H01m 3/02, H01m 3/04
[58] Field of Search ............................ 136/145, 146

[56] References Cited
UNITED STATES PATENTS 3,186,877  6/1965  Stanimirovitch................... 136/145
2,707,201  4/1955  Fernald et al...................... 136/146
2,484,787  10/1949  Grant................................ 136/145
2,653,986  9/1953  Philipps........................... 136/145
2,677,007  5/1954  Jensen............................... 136/145
3,014,085  12/1961  Bachman........................... 136/145

FOREIGN PATENTS OR APPLICATIONS 451,391  9/1948  Canada............................. 136/145
717,373  10/1954  Great Britain..................... 136/145
451,628  8/1936  Great Britain..................... 136/145

*Primary Examiner*—Donald L. Walton
*Attorney*—Michael S. Striker

[57] ABSTRACT

A separator for a maintenance-free cell consisting of several layers and being sufficiently porous to serve as the electrolyte holder. At least one of the layers is micro-porous, resistant to migration of heavy metal ions, and proof against short circuits.

11 Claims, 4 Drawing Figures

SEPARATOR FOR MAINTENANCE-FREE CELLS

BACKGROUND OF THE INVENTION

It is known to use a separator consisting of several layers where the electrodes are attached to the separator by means of a fibrous layer. The use of such an electrode-separator unit serves to facilitate the assembly and is especially useful in the case of lead batteries. Such an arrangement is not satisfactory for a maintenance-free battery in that a separator material for use in such a system must have an extremely high absorbency, since virtually all of the electrolyte in the cell must be held by the separator. Furthermore, the plates of the cell cannot be prepared in the usual battery acid where the sulfuric acid has a density of 1.28 – 1.31 g/cm$^3$ because at this high concentration of sulfate ion, strong sulfation results. Instead it is necessary to use sulfuric acid with a density of 1.04 g/cm$^3$ for formation of a plate. Consequently there must be a change of the electrolyte between the formation of the plate and the start of operation. This is not possible if the separator which retains the electrolyte is tightly attached to the electrode, since at one point it must hold the electrolyte fast, and at another, it must be dried between the formation and the insertion into the battery housing. This drying takes place under conditions, such as steam at 150°C which a portion of the separation material cannot tolerate.

In order for a battery to be maintenance free, the separators must have the following properties:

1. The separator must serve as the electrolyte chamber holding the electrolyte tightly in its capillaries.
2. It must have the highest possible volume porosity in order to hold a maximum quantity of electrolyte.
3. It must impede the growth of short circuits.
4. It must be sufficiently flexible so that it can be laid closely against the electrodes thus avoiding the formation of hollow spaces which would increase the internal resistance of the battery.
5. It must have a high resistance to diffusion of damaging ions such as antimony and iron.
6. It must be mechanically stable and handleable so that it can be fashioned into cylindrical cells as well as flat cells.

These requirements are such that they cannot be filled in the present state of the art by means of any separator made of a single material.

SUMMARY OF THE INVENTION

It is an object of the invention to provide a separator suitable for use in maintenance-free cells.

It is a further object of the invention to provide a separator which can serve to hold virtually all of the electrolyte in a cell.

It is yet another object of the invention to provide a separator consisting of layers of more than one type of material.

It is still another object of the invention to provide a separator which adheres tightly to electrodes in a cell and yet which can withstand the operation of removal of one electrolyte and filling with another.

The object of the present invention are achieved by the use of a separator consisting of at least three layers of which the interior layer is resistant to short circuit and to the migration of heavy metal ions and consists of a micro-porous material, while the outer two layers lie tightly against the electrodes and consist of an ultra-fine fiber mass. Where it is desired that the thickness of the separator is greater, then layers of micro-porous material and ultra-fine fibers can be alternated so long as the outer layers which contact the electrodes always consist of ultra-fine fiber mass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
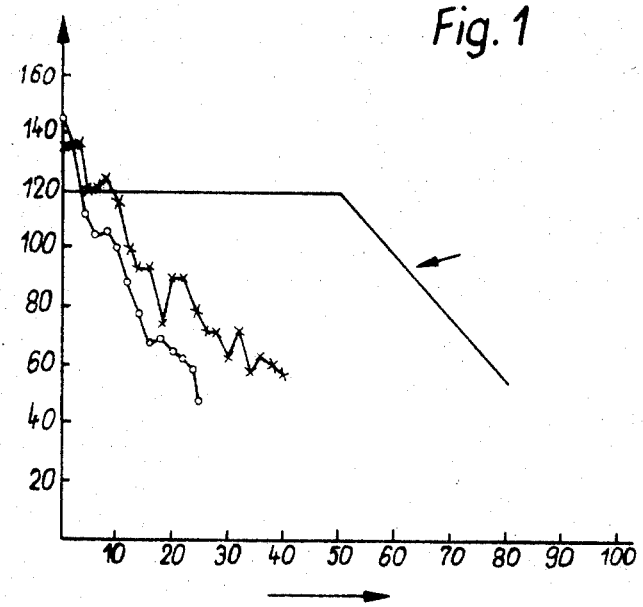
FIG. 1 is a graph showing the performance of cells using conventional separators.
Figure 2:
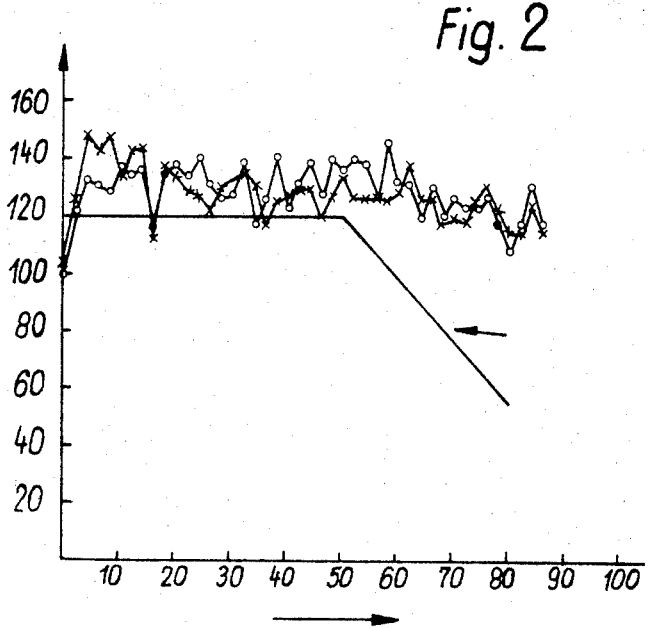
FIG. 2 is a drawing showing the performance of cells using a separator in accordance with the present invention.

FIGS. 1 and 2 show the performance of cells used to power electronic flash in photography. The abscissa shows the number of cycles and the ordinates give the number of flashes per cycle. The solid lines show the number of flashes required per cycle as a function of the cycle number. As is evident from FIG. 1, the number of flashes obtained after a single charge falls below the required number almost from the beginning when the cell is made with conventional separators. In contrast, cells made with the separator of the present invention meet the requirements for approximately 85 cycles with only a few lapses.

Figure 3:
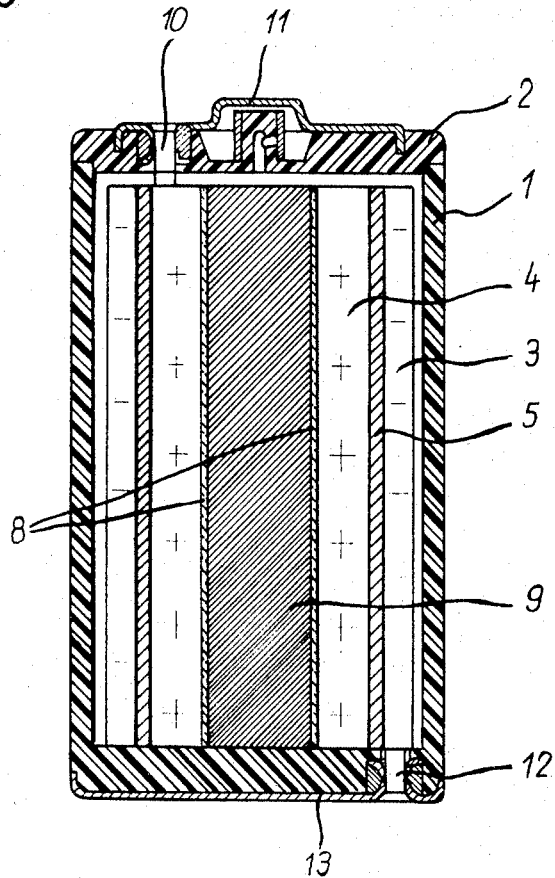
FIG. 3 is an elevational cross section of a cylindrical cell made with a separator of the present invention.
Figure 4:
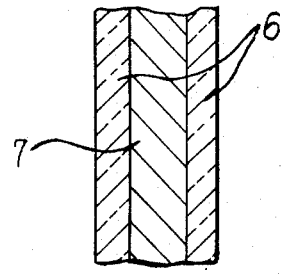
FIG. 4 is a cross section of the separator showing the multi-layer construction.

FIG. 3 shows the cross section of the cylindrical cell wherein the housing 1 is made of polystyrene, and the cover 2 is also made of polystyrene and is locked to the housing. The housing contains the cylindrical negative electrode 3 and the likewise cylindrical positive electrode 4. Both electrodes 3 and 4 are formed in the housing so that the active mass of the negative electrode is essentially lead while that of the positive is lead dioxide. The separator, according to the present invention, and numbered 5, is located between the negative electrode 3 and the positive electrode 4. An enlarged section is shown in FIG. 4. In this case the separator is made of three layers where the outer layer 6 is made of a commercially obtainable glass paper (the length of the fibers is several millimeters, and the cross section is less than one micron) and the intermediate layer 7 is also made of a commercially available latex-bound diatomaceous earth. Before placing the electrode pack into the housing 1, the assembly consisting of the electrodes 3 and 4 with the separator between is pressed together in order to make uniform positive contact between the electrodes 3 and 4 on the one hand, and the glass fiber layer 6 on the other. The inner cylindrical space within the positive electrode 4 serves as a reservoir and consists of two layers: a glass fiber layer 8 on the inner wall of the electrode 4 where the glass fiber material is the same as that in the layer 6; and the remaining space 9 is filled with the diatomaceous earthlatex-mass used in the preparation of the inner layer 7 within the separator. The pole shaft 10 of the positive electrode 4 is soldered to the tin cover 11; the pole shaft 12 of the negative electrode 3 is soldered to the bottom cover 13. The top and bottom plates 11 and 13 serve as the terminals of the cylindrical cell.

The outer layers of the separator can be made of fibers of any of the following materials: glass, polyester glass, polyacrilonitrile, polyethylene, polypropylene, polyvinylchloride, polytetrafluoroethylene, modified polyvinylchloride-polyacrylonitrile, and cellulose where the fibers are covered with polyethylene or polypropylene.

The micro-porous layers are based on diatomaceous earth, silica gel, paper or cellulose. One group of binders which is satisfactory for use with diatomaceous earth and silica gel consists of natural rubber, isoprene, chloroprene and butadiene styrene. This group can be used with or without polymerization catalysts such as the peroxides. A second group which is useful with diatomaceous earth, silica gel, paper or cellulose consists of the aqueous solutions of resins of formaldehyde with phenol, cresol or melamine. This group uses sulfuric acid as the polymerization catalyst. A third type of binder which may be used is an aqueous emulsion of vinylchloride using peroxide catalysts to cause the polymerization. Another method of making separator layers is to put a layer of polyethylene or polypropylene on particles to be bound (for example, diatomaceous earth, silica gel, or glass fibers with a diameter of up to 4 microns and a length of up to 100 microns), and finally sintering the combination.

The structure of the micro-porous layer depends on the method of preparation and therefore cannot be unequivocably described. It is important that the porosity of the various layers should lie between 50 and 95 percent and preferably between 70 and 80 percent. Also the pore diameter should be in the range of between 1 and 20 microns, and preferably between 5 and 15 microns. The optimum ranges of these properties will depend on the particular application.

It is important also that the absorption rate of the different layers should not vary by more than about 15 percent from each other. The reason is that if electrolyte loss or water loss occurs prior to closing the cell or as a result of a too-rapid charge, then the electrolyte will be lost preferentially from the layer with the lower absorption rate. As a result, this layer will dry out quickly and the resistance of the cell will increase to a point where the cell is no longer useful.

The thickness of the separator will vary also with the application. For instance, a 4 V/3Ah electronic flash battery for photography was made with a separator having a thickness of 1.1 millimeters. A 2 V/2Ah battery was made with a separator with 11 layers. The thickness of the separator was 6.0 millimeters. The arrangement of the layers was (+)/GGMGGMGMGMG/(−) where the plus and minus signs represent the respective electrodes, M is a micro-porous layer, and G is a glass fiber layer. It should be noted that the outer layers of the separator consist of fibers.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a maintenance-free cell, in combination, first and second spaced electrodes; an electrolyte; and a multilayer highly electrolyte-absorbent separator positioned between said electrodes and comprising a plurality of neighboring layers each having a respective electrolyte-absorption rate, the electrolyte-absorption rate of neighboring layers differing by at most 15 percent, said separator including at least a first layer of ultrafine fibrous material adjoining said first electrode, a second layer of ultrafine material adjoining said second electrode, and a third layer of microporous material intermediate said first and second layers.

2. The cell as defined in claim 1, wherein said microporous material is selected from the group consisting of silica gel particles held together with a binder, diatomaceous earth held together with a binder, and ribless paper containing a binder.

3. The cell as defined in claim 1, wherein said fibrous material is selected from the group consisting of glass, polyethylene, polypropylene, polyvinylchloride, polytetrafluoroethylene, polyesters, polyacrylonitrile, modified polyvinylchloride-polyacrylonitrile, cellulose fibers coated with polyethylene, and cellulose fibers coated with polypropylene.

4. The cell as defined in claim 1, said separator having a thickness between 1 mm and 6 mm.

5. The cell as defined in claim 1, wherein said microporous material is selected from the group consisting of diatomaceous earth, silica gel and cellulose, bound together with a material selected from the group consisting of natural rubber, isoprene, chloroprene, butadiene styrol, phenolic resins, resins based on cresol and resins based on melamine.

6. The cell as defined in claim 1, wherein said microporous material has pores with diameters ranging from 1–20 microns.

7. The cell as defined in claim 1, wherein said microporous material has pores with diameters ranging from 5–15 microns.

8. A combination as defined in claim 1, at least said third layer of microporous material having a porosity between substantially 50 and substantially 95 percent.

9. A combination as defined in claim 1, at least said third layer of microporous material having a porosity between substantially 70 and substantially 80 percent.

10. A combination as defined in claim 1, said fibrous material comprising fibers having a thickness less than 1 micron.

11. A combination as defined in claim 1, said microporous material comprising fibers having diameters of about 4 microns and lengths of about 100 microns.

* * * * *